Feb. 18, 1947.  P. G. FRANKLIN  2,416,050
LUMBER STACKER
Filed Jan. 6, 1945  5 Sheets-Sheet 1

Inventor
Phillip George Franklin,

By Clarence A. O'Brien
and Harvey B. Jacobson
Attorney

Feb. 18, 1947. P. G. FRANKLIN 2,416,050
LUMBER STACKER
Filed Jan. 6, 1945 5 Sheets-Sheet 3

Inventor
Phillip George Franklin,
By Clarence A. O'Brien
and Harvey B. Jacobson
Attorney

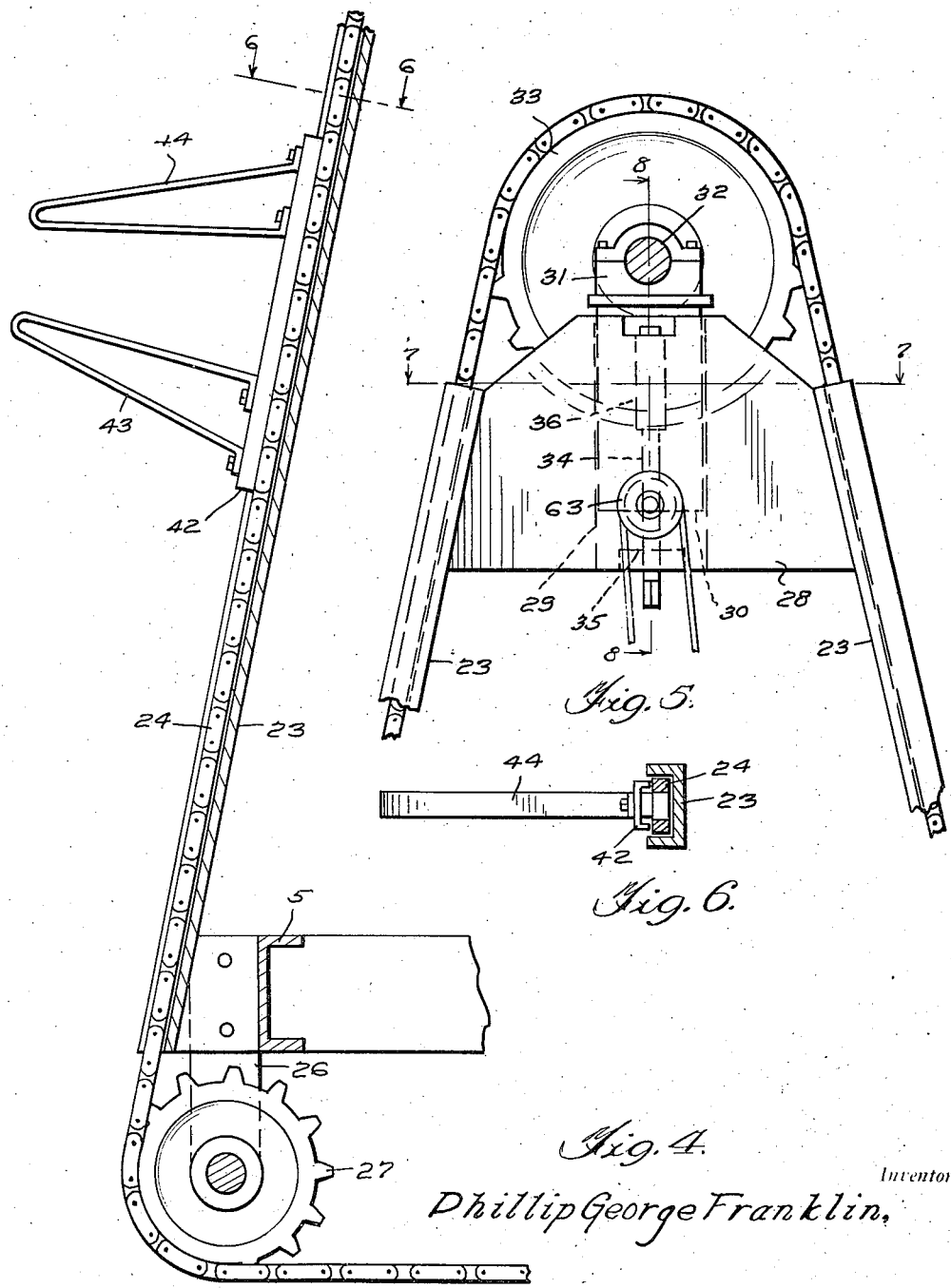

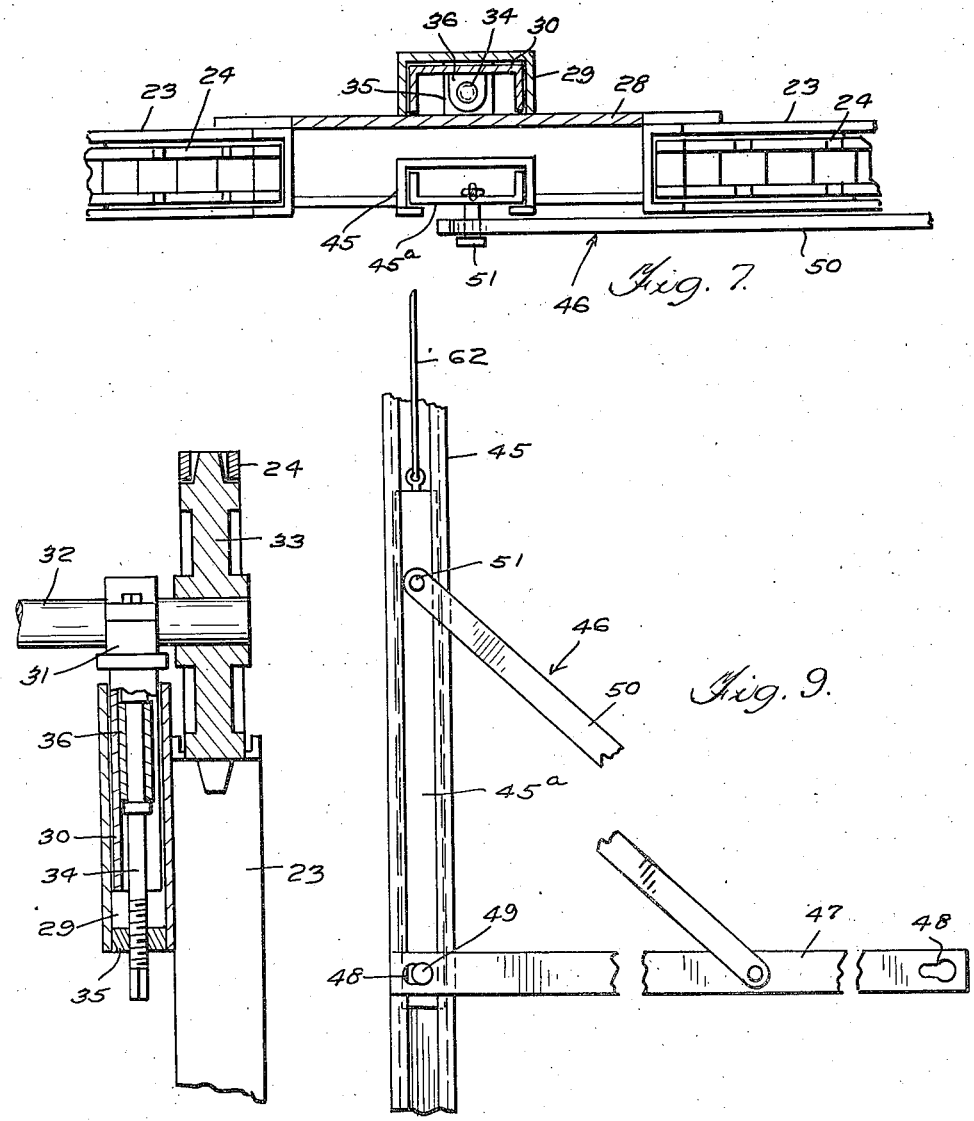

Patented Feb. 18, 1947

2,416,050

UNITED STATES PATENT OFFICE 2,416,050

LUMBER STACKER

Phillip George Franklin, Leavenworth, Wash.

Application January 6, 1945, Serial No. 571,574

1 Claim. (Cl. 198—154)

This invention relates to new and useful improvements in lumber stacking machines and more particularly to those of power driven type.

The principal object of the present invention is to provide a lumber stacker which will serve to stack lumber to heights two or three times the height that can be stacked by hand.

Another important object of the invention is to provide a lumber stacker which has certain factors substantially automatic in operation to relieve manual efforts.

Another important object of the invention is to provide a machine of the character stated which can be easily controlled.

Other objects and advantages of the invention will become apparent to the reader of the following description.

In the drawings:

Figure 4 is a sectional view taken substantially on the line 4—4 of Figure 3.

Figure 5 is a fragmentary detailed sectional view taken substantially on the line 5—5 of Figure 1.

Figure 6 is a sectional view taken substantially on the line 6—6 of Figure 4.

Figure 7 is a section taken substantially on the line 7—7 of Figure 5.

Figure 8 is a section on the line 8—8 of Figure 5.

Figure 9 is an enlarged side elevational view of one of the deflectors.

Figure 1:
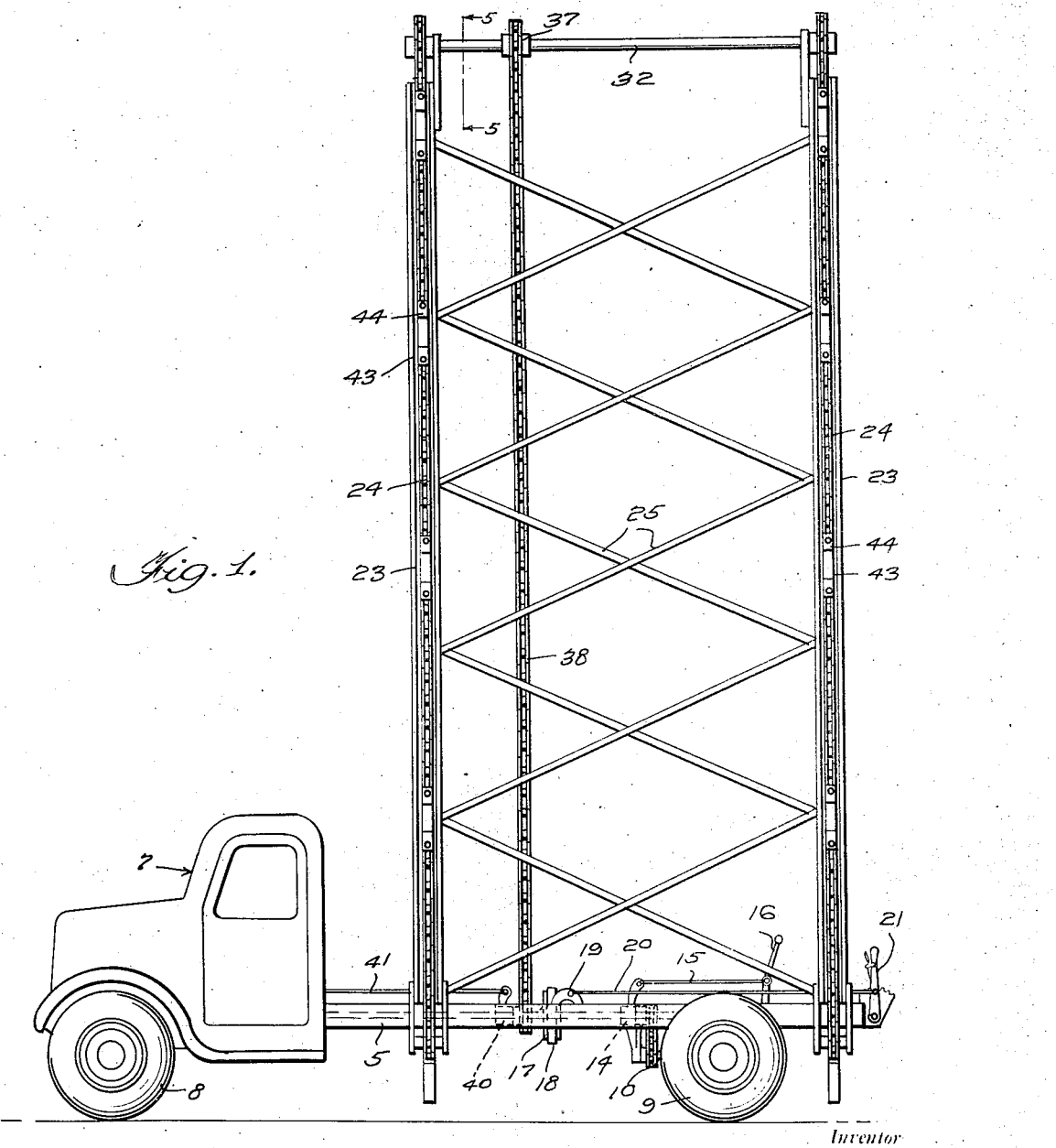
Figure 1 represents a side elevational view of the machine.
Figure 2:
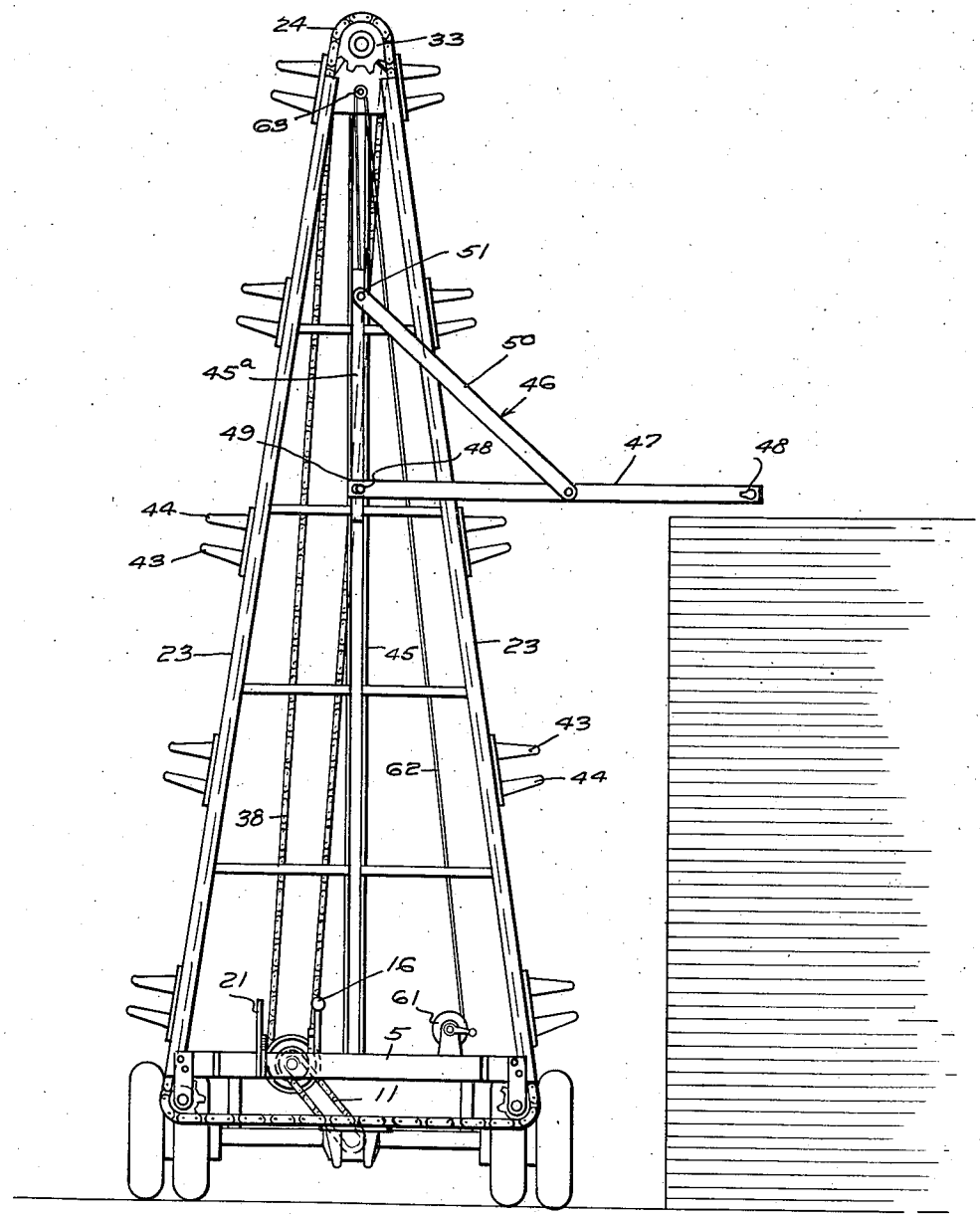
Figure 2 is a rear elevational view of the machine.
Figure 3:
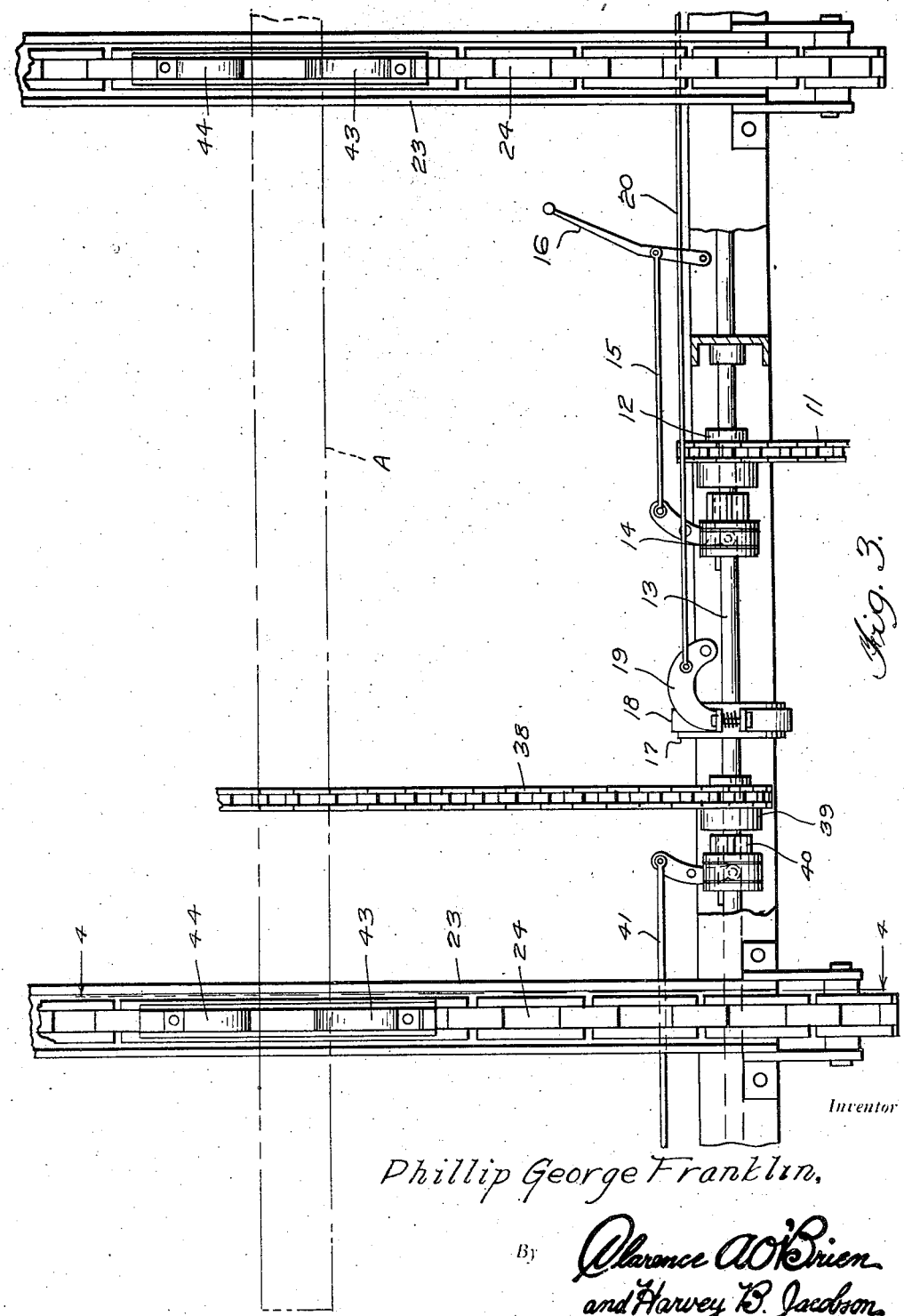
Figure 3 is an enlarged fragmentary side elevational view showing the control means.

Referring in detail to the drawings wherein like numerals designate like parts, it can be seen that numeral 5 denotes the chassis of a truck which may have a cab 7. Numeral 8 denotes the front wheels, while numeral 9 denotes the rear wheels and numeral 10 denotes a shaft from the differential for the rear wheels which has a sprocket from which a sprocket chain 11 extends to train over a sprocket wheel 12 rotatably mounted on a shaft 13. The drive shaft 13 extends from the motor of the vehicle. Associated with the sprocket wheel 12 is a dog clutch 14, a control arm of which is connected by a rod 15 to a throw lever 16.

On the shaft 13 is a brake drum 17 around which is a brake band 18 contractible by a lever 19 which is connected through the medium of a control rod 20 to a hand lever 21 at the rear end of the frame 5. A suitable detent is provided for this hand lever 21.

Extending upwardly from each side of the chassis frame 5 is a pair of substantially spaced channeled members 23 which serve as guideways for endless sprocket chains 24, 24. These channeled members 23 at each side of the machine are braced by crossed brace members 25.

Mounted on depending brackets 26 carried by the chassis frame 5 are sprocket wheels 27 under which the sprocket chains 24 are trained, the sprocket chains passing under the frame 5 in their movement from one side of the machine to the other.

The upper ends of opposed channeled members 23 are bridged by plates 28 each of which has a vertical guideway 29 therein for the reception of a slide plate 30. A bearing structure 31 is provided at the upper end of each of these slide plates 30 for supporting the corresponding end of a horizontal shaft 32, at the ends of which are sprocket wheels 33 over which the aforementioned sprocket chains 24 are trained.

The bearings 31 are adjustable through the means of screw shafts 34. Each of these screw shafts is disposed through a fixed nut 35 at the lower portion of the slideway 29 of the plate 28 and has its upper end swivelly connected as at 36 to the slide plate 30.

A sprocket wheel 37 on the shaft 32 has a sprocket drive chain 38 trained thereover and extending upwardly from a sprocket wheel 39 on the aforementioned drive shaft 13. A dog clutch 40 is cooperative with the sprocket wheel 39, the latter being freely rotatable on the shaft 13 and this dog clutch 40 can be controlled by a control rod 41 extending into the cab 7.

Attached to the chains 24 at certain spaced intervals are bars 42. From the lower and upper ends thereof protrude substantial carrier arms 43, 44, the opposed legs of which converge slightly toward each other so as to prevent the accidental displacement of lumber therefrom regardless on which arm the lumber is being carried.

Vertical channeled posts 45 are provided on the frame 5 and extend at the top of the stacking apparatus. Supported by each of these posts 45 is a lumber deflector generally referred to by numeral 46 and shown in detail in Figure 9. Each of these deflectors consists of a horizontal arm 47 having keyhole slots 48, 48 at the ends thereof to accommodate a stud 49 protruding from a slide 45a operating in the corresponding post 45, depending upon which side of the machine the deflector 46 is being used. Each of the arms 47 is supported by a lumber deflecting brace 50, the lower end being pivotally connected to the intermediate portion of the corresponding arm 47 while its upper end is pivotally secured as at 51 to the slide 45a.

It can now be seen that when the machine is set in operation, the chains 24 will travel, carrying the carrier arms 43, 44 with lumber interposed between the same. Obviously, as the lumber reaches the top of the machine, the lumber will move from one arm 43 to the other arm 44 as the lumber descends the other side of the machine and as it reaches the deflectors 46, the lumber rides the deflecting braces 50 causing the lumber to move outwardly and off of the arms 44, subsequently sliding down the deflecting braces 50 to rest on the horizontal arms 47 from where the lumber can be removed by workmen located on the stack who act to properly pile the lumber to build up the stack.

A winch 61 is mounted on the frame 5 and has a cable 62 extending therefrom and over a pulley 63 from where it extends downwardly to connect to the upper end of one of the slides 45a. Operation of the winch 61 regulates the elevation at which deflectors 46 are to set.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

In a reversible lumber stacker on a power driven vehicle with a chassis, a motor and a motor driven shaft running along the vehicle in a longitudinal direction, an upright structure secured on the chassis and consisting of pairs of channels converging upwardly, arranged symmetrically with respect to the central vertical plane of the vehicle, endless chains extending up one side and down the other side of said channels, a series of lumber carrying parallel jaws protruding perpendicularly from the chains and means for operating and controlling the chains, consisting of a sprocket wheel operatively connected with the motor shaft, a second longitudinal drive shaft on said vehicle, means for driving said drive shaft from the motor shaft, including a sprocket wheel loosely mounted on said drive shaft, a chain driven by the sprocket wheel, operatively connected with the motor shaft, and a clutch for coupling the loosely mounted sprocket wheel with said drive shaft, a brake mechanism on said drive shaft, a further sprocket wheel, loosely seated on said drive shaft, a hand operated clutch for coupling said last mentioned sprocket wheel with the said drive shaft, a driving chain, a driven shaft at the top of the structure and a sprocket wheel operated by said driving chain on said driven shaft, means for making said driven shaft vertically adjustable, including plates arranged between the channels, guides on said plates, sliding members and bearings carried thereby for carrying said driven shaft, and a member for adjustably fixing the position of the sliding member, means for deflecting lumber from said jaws, comprising a pair of central, vertical posts erected on the chassis with pulleys at the top, a slide in each post, a winch on the chassis with a chain over each pulley connected to said slides, and deflector means including a deflecting brace pivoted to the aforesaid slide, a lumber receiving horizontal arm pivotally carried by the deflector brace near its middle, a central stud on said slide and means for attaching either end of the horizontal arm to said central stud.

PHILLIP GEORGE FRANKLIN.

REFERENCES CITED

The following references are of record in the file of this patent:

UNITED STATES PATENTS

| Number | Name | Date |
| --- | --- | --- |
| 1,172,042 | Peterman | Feb. 15, 1916 |
| 1,575,339 | Horstkotte | Mar. 2, 1926 |
| 1,641,987 | Johnson | Sept. 6, 1927 |
| 1,269,987 | Werden | June 18, 1918 |

FOREIGN PATENTS

| Number | Country | Date |
| --- | --- | --- |
| 28,862 | Australian of 1930 | Sept. 7, 1931 |